United States Patent [19]

McCallister

[11] Patent Number: 4,531,224
[45] Date of Patent: Jul. 23, 1985

[54] LOW SIGNAL-TO-NOISE RATIO SYMBOL SYNCHRONIZER

[75] Inventor: Ronald D. McCallister, Scottsdale, Ariz.

[73] Assignee: Motorola, Inc., Schaumburg, Ill.

[21] Appl. No.: 507,193

[22] Filed: Jun. 23, 1983

[51] Int. Cl.³ .......................... H03D 3/06; H04L 7/02
[52] U.S. Cl. ..................................... 375/110; 329/50; 370/20; 375/119
[58] Field of Search ...................... 328/72, 74; 375/77, 375/110, 119, 120; 455/202; 370/20; 329/50, 104, 105, 112, 124, 145

[56] References Cited

U.S. PATENT DOCUMENTS

| | | | |
|---|---|---|---|
| 3,675,131 | 7/1972 | Pickholtz | 375/77 |
| 4,064,361 | 12/1977 | Kustka et al. | 375/119 |
| 4,359,692 | 11/1982 | Ryan | 329/50 |
| 4,397,039 | 8/1983 | McAuliffe | 455/202 |
| 4,419,759 | 12/1983 | Poklemba | 329/50 |

*Primary Examiner*—Benedict V. Safourek
*Attorney, Agent, or Firm*—Jonathan P. Meyer

[57] ABSTRACT

A low SNR symbol synchronizer utilizes two quadrature channels and a delay and multiply technique to produce four product signals. Two of the product signals are same-channel products and two are cross-channel products. When combined and applied to a synchronizing apparatus such as a Costas loop, the signals provide improved performance at low SNR and avoid the need to know the carrier frequency when setting the delay.

9 Claims, 2 Drawing Figures

LOW SIGNAL-TO-NOISE RATIO SYMBOL SYNCHRONIZER

FIELD OF THE INVENTION

The present invention relates, in general, to a symbol synchronizer, or timing recovery circuit, particularly suited to low signal to noise ratio (SNR) applications. More particularly, the invention relates to a low SNR symbol synchronizer which does not require knowledge of the carrier frequency for operability.

BACKGROUND OF THE INVENTION

Recovery of the timing of a received digital data signal is necessary in order to demodulate or otherwise utilize the signal. In other words, the sampling in the receiver must be synchronized with the modulation imposed at the transmitter.

Since no spectral component at the timing frequency exists in the signal as it is received, many methods have evolved for creating such a component, or tone, to which a sampling device in the receiver can be synchronized. An example of such a device is disclosed in U.S. Pat. No. 4,064,361 issued to Kustka et al. One embodiment disclosed therein comprises two quadrature channels, each of which is split into a delayed and an undelayed portion. The delayed and undelayed portions in each channel are correlated, or multiplied, and the two channels are recombined to produce the tone bearing signal. However, due to the correlation of the noise in each of the channels, the performance of this device may be unsatisfactory at low SNR. In addition, the delay time must be chosen with knowledge of the carrier frequency, thus severely limiting the range of application of such a device.

SUMMARY OF THE INVENTION

Accordingly, it is an object of the present invention to provide an improved symbol synchronizer.

It is a further object of the present invention to provide an improved symbol synchronizer for use in low SNR application.

Yet a further object of the present invention is to provide a symbol synchronizer which can operate without foreknowledge of the carrier frequency of the received signal.

A particular embodiment of the present invention comprises a low SNR symbol synchronizer having two quadrature channels and providing delayed and undelayed versions of the signals in each. First and second product signals are formed by multiplying the delayed version of each channel with its corresponding undelayed version. Third and fourth product signals are formed by multiplying the undelayed version of each channel with the delayed version of the other channel. A sum of the first and second products is formed and a difference of the third and fourth products is formed. The sum and difference are applied to a Costas loop to produce the desired signal.

While the delay of such a symbol synchronizer is advantageously set to approximately one-half the baud period of the received signal, it need not be equal to a multiple of one-half the carrier period, as is required in prior art synchronizers. Furthermore, the synchronizer of the present invention provides improved performance at low SNR.

These and other objects and advantages of the present invention will be apparent to one skilled in the art from the detailed description below taken together with the drawings.

DETAILED DESCRIPTION OF THE INVENTION

Figure 1:
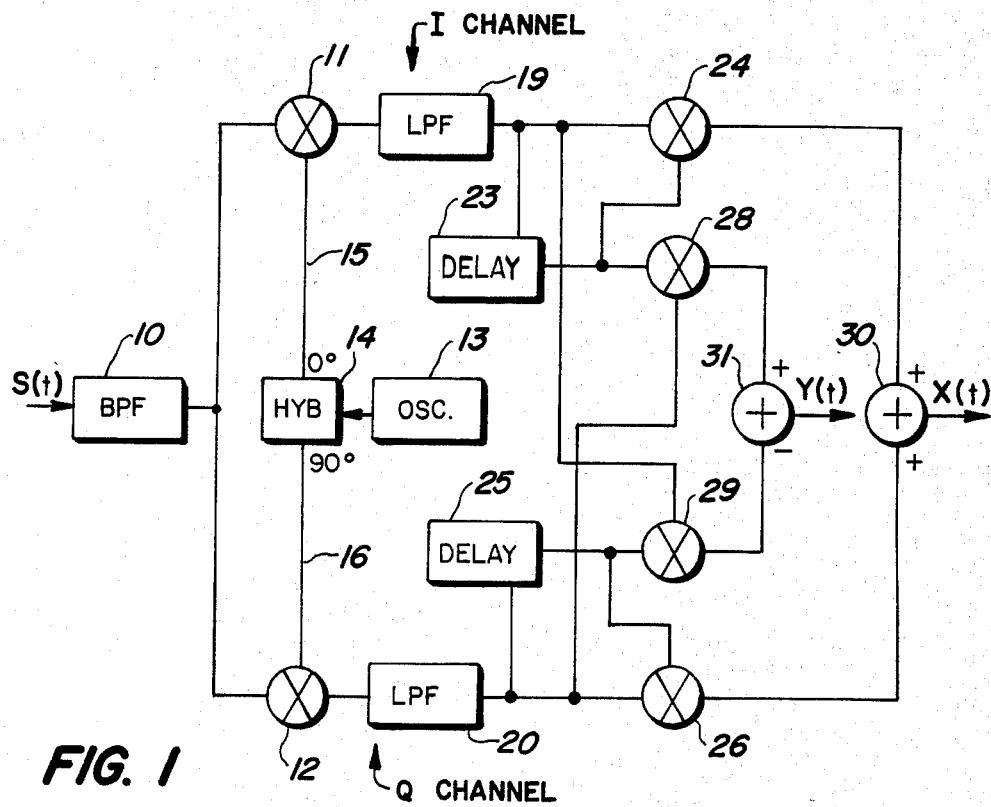
FIG. 1 is a block diagram of a low SNR symbol synchronizer according to the principles of the present invention.

A symbol synchronizer according to the principles of the present invention is intended to receive an input signal S(t) which may be, for instance, a quadrature phase shift keyed (QPSK) signal. Other types of signals which have hidden periodicity and thus require the generation of a tone bearing signal may be substituted. The input signal may be represented in simplified form as:

$$S(t) = D(t) \operatorname{Sin}(\omega_i t). \tag{1}$$

Input signal S(t), which has typically been received from a communication link and is accompanied by broad band noise is first input to a bandpass filter 10 to reject noise which is far removed in frequency from the signals of interest. The output of bandpass filter 10 is coupled to a first multiplier 11 and a second multiplier 12, wherein the input signal is to be separated into quadrature channels. To this end, an oscillator 13, which produces a signal having an angular frequency $\omega_r$, is coupled to a hybrid phase splitter 14. A first output 15 of hybrid 14 is coupled to first multiplier 11 and carries an in-phase version of the signal produced by oscillator 13. A second output 16 of hybrid 14 is coupled to second multiplier 12 and carries a quad-phase, or 90° shifted, version of the signal produced by oscillator 13.

As is familiar in the art, the signals produced by multipliers 11 and 12 are quadrature-related versions of the input signal S(t). These signals, which are often referred to as the I and Q channels, respectively, have components at an angular frequency $\omega_0$, which is equal to the difference between the input angular frequency $\omega_i$ and the oscillator angular frequency $\omega_r$, and at higher frequencies. A first low pass filter 19 coupled to the output of first multiplier 11 and a second low pass filter 20 coupled to the output of second multiplier 12 function to reject the sum frequency components in the I and Q channels respectively.

A first delay circuit 23 has an input coupled to an output of low pass filter 19 and an output coupled to an input of a first multiplier 24. Multiplier 24 also has an input coupled to an output of low pass filter 19. The output of multiplier 24 is a first product signal. This is the standard delay and multiply arrangement used in many timing recovery circuits. A second delay circuit 25 has an input coupled to an output of low pass filter 20 and an output coupled to an input of second multiplier 26. Second multiplier 26 also has an input coupled to an output of low pass filter 20. Multiplier 26 produces a second product signal.

In prior art timing recovery or symbol synchronizer circuits which use the delay and multiply technique it is necessary to choose the delay applied by the delay circuits to be a multiple of the period of the carrier on which the modulation to be detected was imposed. In other words, it is necessary to know the frequency of the carrier before prior art timing recovery techniques can be applied. As will be discussed below, it is not necessary to have such knowledge when practicing the present invention. Therefore, the delay applied by delay circuits 23 and 25, τ, is chosen to be one-half the baud interval T. The performance of the synchronizer is only slightly degraded by substantial (e.g. ±50%) deviations from this optimal delay period. In an application in which the baud rate is not known ahead of time, delay circuits 23 and 25 will comprise banks of selectable delay circuits so that a range of different delays may be applied to optimize performance. As is well known, the relationship between the delay applied and the baud interval T need not be precise to achieve acceptable performance.

A third multiplier 28 has inputs coupled to an output of delay circuit 23 and to an output of low pass filter 20. Therefore, the third product signal produced by multiplier 28 is the product of the delayed version of the I channel signal and the undelayed version of the Q channel signal. A fourth multiplier 29 has inputs coupled to an output of low pass filter 19 and an output of delay circuit 25 and produces a fourth product signal. The fourth product signal is the product of the undelayed version of the I channel signal and the delayed version of the Q channel signal. It is the third and fourth product signals which provide the improved low SNR performance of the present invention due to the cross channel correlation. Also, as will be seen, the third and fourth product signals can be used in conjunction with the first and second product signals to produce a tone-bearing signal for use in synchronizing to the data rate and phase of the input signal without knowledge of the carrier frequency.

Figure 2:
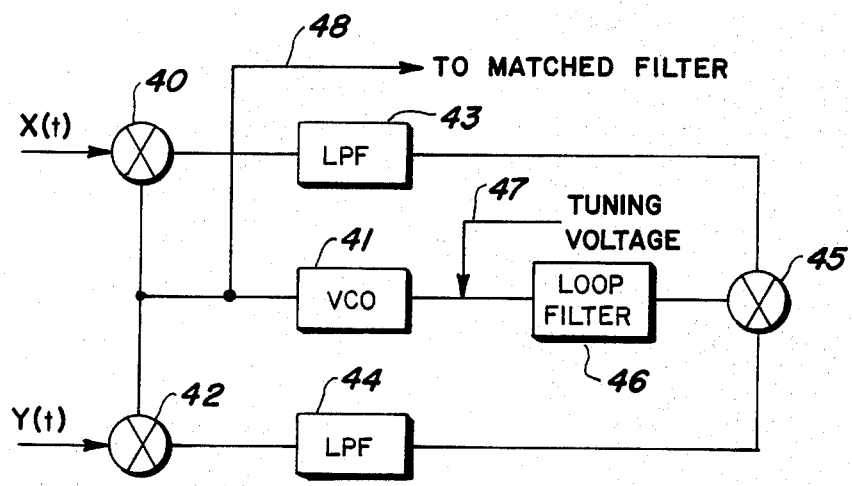
FIG. 2 is a block diagram of a circuit useful in combination with the circuit set out in FIG. 1.

In order to use the product signals produced by multipliers 24, 26, 28 and 29, for instance in the phase locked loop of FIG. 2, it is necessary to combine them in some fashion. A first summing circuit 30 has inputs coupled to the outputs of first multiplier 24 and second multiplier 26 and produces a signal X(t) which is the sum of the first and second product signals. It may be represented as:

$$X(t) = D(t)D(t-\tau) \sin (\omega_0 \tau). \quad (2)$$

A second summing circuit 31 has an input coupled to an output of third multiplier 28 and an inverted input coupled to an output of fourth multiplier 29, whereby the output of summing circuit 31, Y(t), is equal to the difference between the third and fourth product signals. It may be represented as:

$$Y(t) = D(t)D(t-\tau) \cos (\omega_0 \tau). \quad (3)$$

As is apparent to those skilled in the art, the functions X(t) and Y(t) may be readily used for synchronizing purposes. For instance, they may be orthogonally combined to form a third function Z(t) which may be represented as:

$$Z(t) = D(t)D(t-\tau(\text{EXP } [j\omega_0\tau]). \quad (4)$$

Referring now to FIG. 2, a circuit, commonly referred to as a Costas loop, is shown which may be used in conjunction with the apparatus of FIG. 1 for symbol synchronizing. A multiplier 40 has inputs coupled to a source of the function X(t) and to an output of a voltage controlled oscillator (VCO). A multiplier 42 has inputs coupled to a source of the function Y(t) and to the output of VCO 41. A first low pass filter 43 coupled to the output of multiplier 40 and a second low pass filter 44 coupled to the output of multiplier 42 serve to reject the sum frequency components in the two channels. The outputs of low pass filters 43 and 44 are coupled to a multiplier 45. An output of multiplier 45 is coupled to a loop filter 46, whose output is coupled to an input of VCO 41. A tuning voltage input 47 is also coupled to an input of VCO 41. An output 48 is coupled to an output of VCO 41. Normally, output 48 will be coupled to the matched filter of the data receiver to provide the required clock for data detection. Tuning voltage input 47 is used to bring the output of VCO 41 close to the desired output to facilitate acquisition.

While the invention has been particularly shown and described with reference to a preferred embodiment thereof it will be apparent to one skilled in the art that various other modifications and changes may be made to the present invention from the principles of the invention described without departing from the spirit and scope thereof.

I claim:

1. Apparatus for use in a digital data receiver comprising:
means for forming first and second quadrature signals from an input signal;
means for forming delayed and undelayed versions of said first and second quadrature signals;
means for multiplying said undelayed version of said first signal with said delayed version of said first signal to produce a first product;
means for multiplying said undelayed version of said second signal with said delayed version of said second signal to produce a second product;
means for multiplying said undelayed version of said second signal with said delayed version of said first signal to produce a third product;
means for multiplying said undelayed version of said first signal with said delayed version of said second signal to produce a fourth product; and
means for combining said first, second, third and fourth products to produce at least one signal indicative of a characteristic of said input signal.

2. An apparatus according to claim 1 wherein said means for combining further comprises:
means for adding said first and second products to produce a sum;
means for subtracting said third and fourth products to produce a difference; and
means for utilizing said sum and difference to produce a signal synchronous with a timing rate of said input signal.

3. An apparatus according to claim 2 wherein said means for utilizing comprises:
a Costas loop.

4. A low SNR symbol synchronizer comprising:
means for producing an in-phase oscillator signal and a quad-phase oscillator signal;
a first multiplier coupled to an input signal and to said in-phase oscillator signal and producing an I channel signal;
a second multiplier coupled to said input signal and to said quad-phase oscillator signal and producing a Q channel signal;
first and second low pass filters coupled to said first and second multipliers, respectively, for rejecting sum frequency components in said I and Q channel signals;

first delay means coupled to an output of said first low pass filter for applying a predetermined delay to said I channel signal;

second delay means coupled to an output of said second low pass filter for applying a delay identical to that applied by said first delay means to said Q channel signal;

a third multiplier having inputs coupled to an output of said first low pass filter and an output of said first delay means;

a fourth multiplier having inputs coupled to an output of said first delay means and an output of said first low pass filter;

a fifth multiplier having inputs coupled to an output of said second delay means and an output of said first low pass filter;

a sixth multiplier having inputs coupled to an output of said second low pass filter and an output of said second delay means; and synchronizing means coupled to outputs of said third, fourth, fifth and sixth multipliers for synchronizing a device to a data rate and phase of said input signal.

5. A low SNR symbol synchronizer according to claim 4 wherein said synchronizing means further comprises:

means for subtracting an output of said fifth multiplier from an output of said fourth multiplier;

means for adding an output of said third multiplier and an output of said sixth multiplier; and a Costas loop coupled to said adding and subtracting means.

6. A low SNR symbol synchronizer according to claim 4 wherein said first and second delay means each comprise:

means for selectably applying one of several delays.

7. A method of producing a signal indicative of a characteristic of an input signal comprising the steps of:

forming first and second quadrature signals from said input signal;

forming delayed and undelayed versions of said first and second quadrature signals;

multiplying said delayed and undelayed versions of said first quadrature signal to produce a first product signal;

multiplying said delayed and undelayed versions of said second quadrature signal to produce a second product signal;

multiplying said delayed version of said first quadrature signal with said undelayed version of said second quadrature signal to produce a third product signal;

multiplying said delayed version of said second quadrature signal with said undelayed version of said first quadrature signal to produce a fourth product signal; and combining said first, second, third and fourth product signals to produce at least one signal indicative of a charcteristic of said input signal.

8. A method according to claim 7 wherein said step of combining said first, second, third and fourth product signals comprises the steps of:

adding said first and second product signals to produce a sum signal; and subtracting said third and fourth product signals to produce a difference signal.

9. A method according to claim 8 further comprising the step of:

applying said sum and difference signals to a Costas loop to produce a tone synchronized to a baud rate of said input signal.

* * * * *